United States Patent [19]
Hartzell, Jr.

[11] 4,099,415
[45] Jul. 11, 1978

[54] TEMPERATURE COMPENSATION CIRCUIT FOR A FLUID DAMPED SERVO SYSTEM

[75] Inventor: Robert Eugene Hartzell, Jr., Pittsburg, Calif.

[73] Assignee: Systron-Donner Corporation, Concord, Calif.

[21] Appl. No.: 829,774

[22] Filed: Sep. 1, 1977

[51] Int. Cl.[2] .................... G01P 15/08; G01D 11/12
[52] U.S. Cl. .................................... 73/497; 318/634
[58] Field of Search ........................ 73/497, 516 R; 318/471–473, 623, 634; 323/68

[56] References Cited

U.S. PATENT DOCUMENTS

| | | | |
|---|---|---|---|
| 3,782,205 | 1/1974 | Hand | 73/497 |
| 3,813,946 | 6/1974 | Robbins et al. | 73/497 |

*Primary Examiner*—James J. Gill
*Attorney, Agent, or Firm*—Flehr, Hohbach, Test, Albritton & Herbert

[57] ABSTRACT

The servo system has a fluid damped moving mass, a pickoff providing a signal indicative of the position of the moving mass, and a torquer disposed to move the mass. A single operational amplifier has a pair of inputs and an output. One input is connected to the pickoff signal and the other is connected to a reference signal. A feedback path extends between the operational amplifier input and output, and includes a temperature sensitive combination in series with a feedback resistor. A basic gain control resistance is connected between the node located intermediate of the temperature sensitive combination and feedback resistor and the reference signal. Basic gain and gain change over a temperature range are independent of interaction therebetween as each is set, and a selected servo system operational characteristic is maintained substantially constant over the temperature range.

3 Claims, 4 Drawing Figures

TEMPERATURE COMPENSATION CIRCUIT FOR A FLUID DAMPED SERVO SYSTEM

BACKGROUND OF THE INVENTION

This invention relates to temperature stabilization in a servo system, and more particularly to such stabilization in a fluid damped servo system.

A fluid filled force balance type instrument such as the servo accelerometer disclosed in U.S. Pat. No. 3,331,253 for an accelerometer and sensing assembly utilizes the fluid not only for flotation and relief of forces at the support points for the inertial mass, but also to provide viscous damping forces for the motion of the inertial mass. Most flotation fluids having acceptable densities for flotation purposes are also susceptable to considerable change in viscosity over normal operating temperature ranges. As a consequence, desirable servo characteristics set at room temperature may change appreciably at the high and low ends of a specified temperature range. To maintain a given natural frequency or damping ratio, for example, requires an increase in servo gain for a decrease in temperature as the viscosity of the flotation fluid becomes greater with decreasing temperature. Apparatus is therefore desirable which will provide an increase in the servo system gain as temperature decreases, and a decrease in servo system gain as temperature increases. Such apparatus ideally would allow independent setting of necessary gain at room temperature and necessary gain change over the temperature range to maintain the desired operating characteristics.

SUMMARY AND OBJECTS OF THE INVENTION

In general the electrical circuit disclosed herein provides temperature compensation over a predetermined temperature range for a fluid damped servo system, so that system operating characteristics are held substantially constant throughout the temperature range. The circuit includes a single operational amplifier having two input terminals and an output terminal. An input resistor is connected to one of the input terminals and a feedback path extends between the output terminal and the one input terminal. A circuit combination having a thermistor and a temperature gain change resistor connected in parallel is included in the feedback path. A feedback resistor in series with the parallel combination is also located in the feedback path. A room temperature gain resistor is connected between a reference supplied to the other input of the operational amplifier and a circuit node located between the feedback resistor and the parallel combination in the feedback path. Servo gain is thereby set at room temperature by proper selection of the room temperature gain resistor. Servo gain is increased with decreasing temperature by the parallel circuit combination in the feedback path as fluid viscosity increases with decreasing temperature to thereby stabilize the servo system operating parameters.

It is an object of the temperature compensation circuit to provide desired servo gain setting at room temperature as well as servo gain change setting over a temperature range without interaction between the two settings.

Another object of the present invention is to provide a temperature compensation circuit which contains the fewest possible components and therefore provides the highest possible reliability.

Another object of the present invention is to provide a compensation circuit which is simple to construct and calibrate.

Another object of the present invention is to provide a temperature compensation circuit which is adaptable to operate in a stable fashion at any nominal temperature and temperature range thereabout.

Additional objects and features of the invention will appear from the following description in which the preferred embodiment has been set forth in detail in conjunction with the accompanying drawings.

DESCRIPTION OF THE PREFERRED EMBODIMENT

Figure 1:
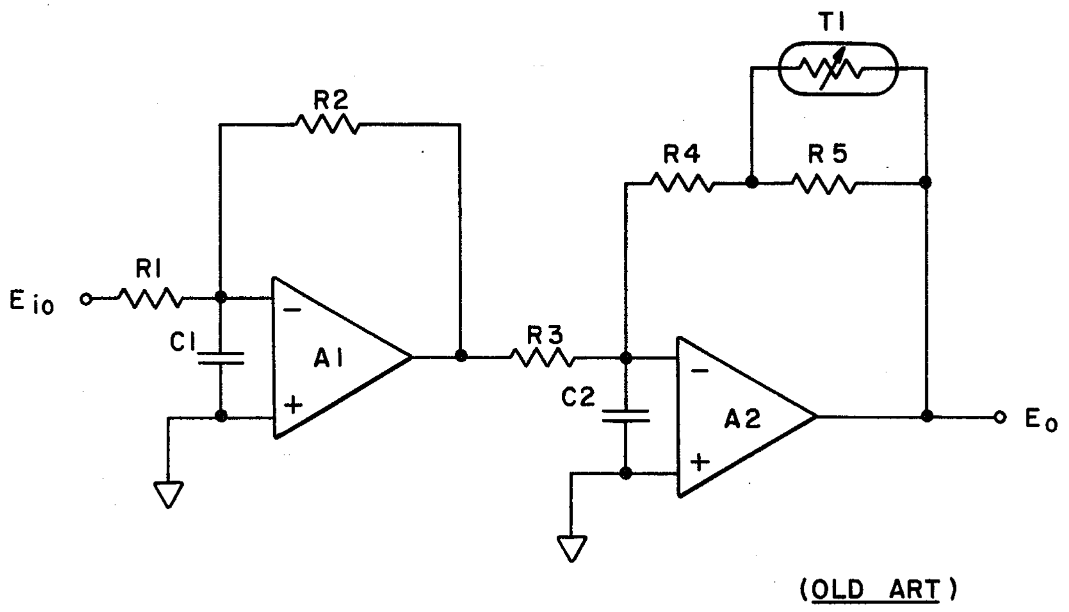
FIG. 1 is an electrical schematic diagram of a known temperature compensation circuit.

In FIG. 1 the forward portion of a servo loop is shown which is used in conjunction with a servoed moving member, such as a moving inertial mass in an accelerometer. The inertial mass may be of the type disclosed in U.S. Pat. No. 3,331,253 which is supported for pivotal motion about an axis of rotation. A pickoff is associated with the moving mass, providing a signal output indicative of the mass position about the axis of movement. The signal output is conditioned and coupled to an input terminal marked $Ei$ which is connected through an input resistor R1 to the inverting input of an operational amplifier A1. A feedback resistor R2 is coupled between the output and the input of amplifier A1 providing an output therefrom in the ratio of R2/R1. The output from operational amplifier A1 is coupled to the inverting input of operational amplifier A2 through input resistor R3. A feedback path around operational amplifier A2 includes the parallel combination of thermistor T1 and resistor R5 in series with resistor R4. The output from the circuit of FIG. 1 shown as Eo is therefore caused to change as temperature affects the resistance of thermistor T1. The change is such as to increase the gain of operational amplifier A2 as the temperature decreases. The change in gain, $\Delta Eo/Ei$, increases as temperature decreases. As a consequence, room temperature gain may be selected by proper selection of feedback resistor R2 around operational amplifier A1, and gain change over the temperature range may be properly adjusted by selection of R5 in proper combination with thermistor T1 in the feedback path around operational amplifier A2. In order to arrange for independent adjustment of the room temperature gain and the gain characteristic over a predetermined temperature range, it has been necessary in the past to use two operational amplifiers in cascade, such as depicted in the circuit of FIG. 1.

Figure 2:
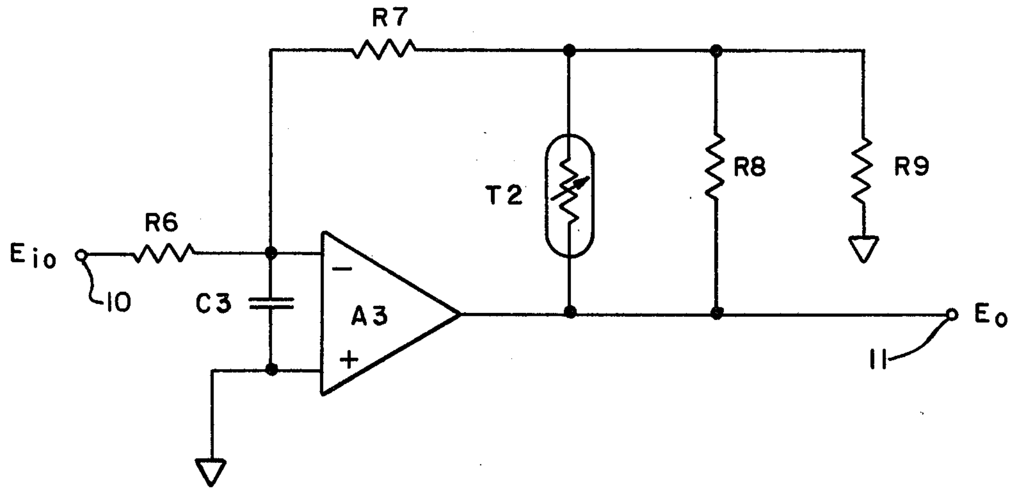
FIG. 2 is an electrical schematic diagram of the disclosed temperature compensations circuit.

Turning now to FIG. 2, the circuit arrangement of this disclosure is seen. As in the case of the circuit of FIG. 1, the circuit of FIG. 2 is useful in the forward portion of a servo loop, wherein a moving member such as a pivotly moveable inertial mass in an angular accelerometer is monitored in position and servoed toward a neutral position. The position of the movable mass about the pivot axis is sensed by a pickoff which provides a signal output indicative thereof. The signal output is conditioned as appropriate for the application, for example as disclosed in U.S. Pat. No. 3,967,064, and is then coupled to an input terminal 10 as an input signal E*i*. E*i* is coupled through resistor R6 to the inverting input on an operational amplifier A3. The noninverting input of operational amplifier A3 is coupled to a reference level, such as ground as shown, and a feedback path is provided between the output and the inverting input of operational amplifier A3. A parallel combination containing a thermistor T2 and a temperature gain change resistor R8 is connected in series with a feedback resistor R7 in the feedback path around operational amplifier A3. A room temperature gain adjust resistor R9 is connected between a node in the feedback path between the parallel combination and feedback resistor R7, and the reference level at the noninverting input terminal of operational amplifier A3. After establishing the values for resistors R6 and R7, and the characteristics of thermister T2, temperature gain change resistor R8 may be selected to provide a predetermined gain change over a predetermined temperature range. Thereafter, without affecting the gain change over the temperature range adjusted by selection of resistor R8, a selection for a resistor R9 may be made at room temperature to obtain the desired room temperature gain, which provides the specified operating characteristics for the servo system. As a result, an output signal Eo at an output terminal 11 is provided with a predetermined gain at room temperature, and a predetermined change in gain over a predetermined temperature range. The output signal E*o* is coupled to a torque device which drives the moving member about its pivot axis toward a neutral position as described for the servo accelerometer described in U.S. Pat. No. 3,331,253.

Figure 3:
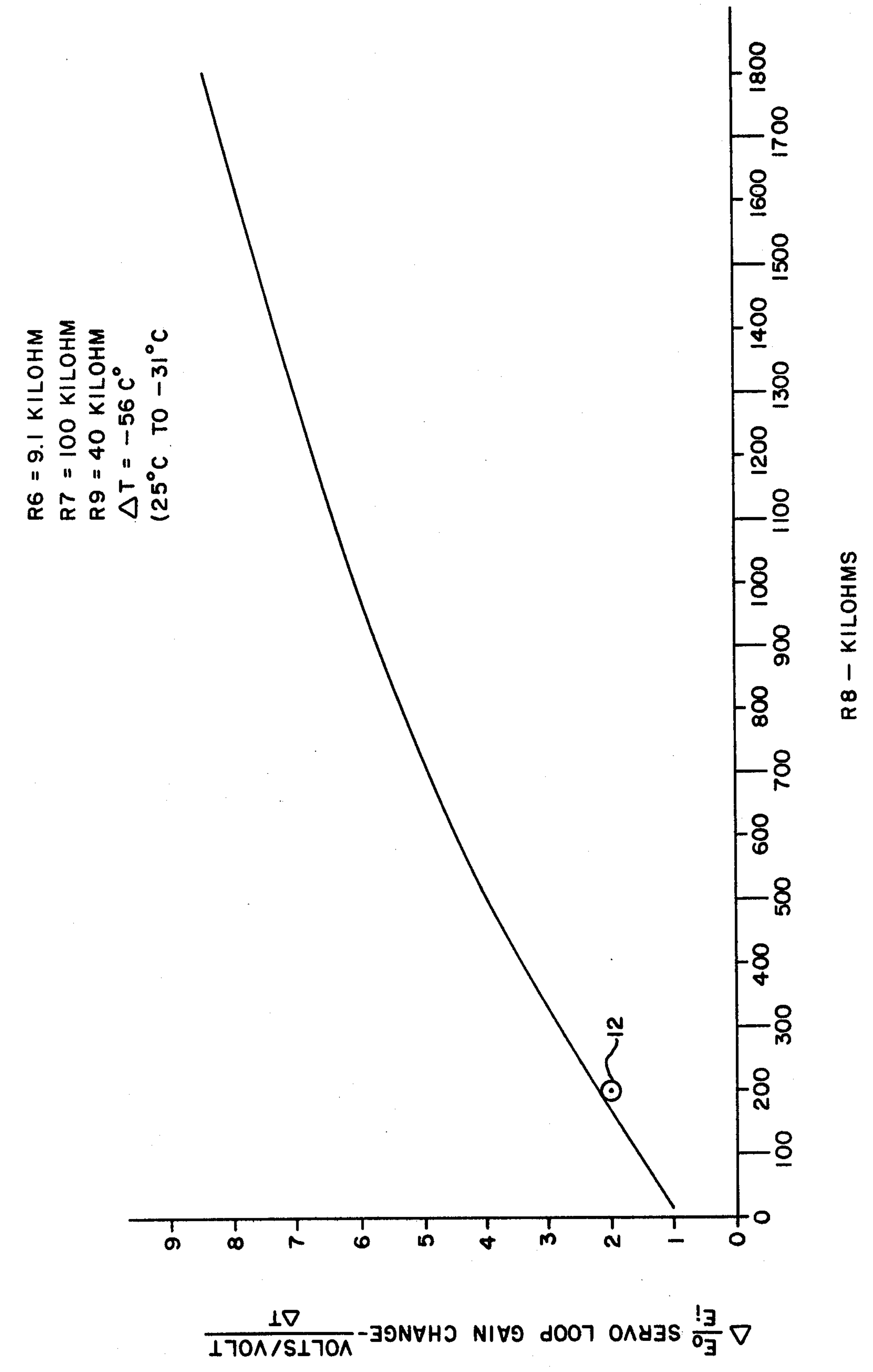
FIG. 3 is a graph showing gain change characteristics over a predetermined temperature range.

In the type of servo system such as that seen in a fluid damped servo accelerometer, the flotation fluid viscosity rises markedly with decreasing temperature. If it is desirable to maintain a relatively constant natural frequency or damping characteristic in the servo system over a predetermined temperature range, it is then necessary to increase the gain in the servo loop as the temperature drops and the flotation and damping fluid viscosity rises. The graph of FIG. 3 shows servo loop gain change over a specified temperature range as a function of the temperature gain change resistor R8. Once the amount of gain increase with decreasing temperature has been ascertained so that the given parameters such as natural frequency or damping ratio will maintain a relatively constant value, the chart of FIG. 3 may be entered and the nominal value for the temperature gain change resistor R8 may be selected. For example the chart of FIG. 3 is constructed for the temperature range of +25° Centigrade to −31° Centigrade. The temperature change is therefore 55° C. For a circuit of FIG. 2 having an input resistor R6 of 9.1 kilohms, a feedback resistor R7 of 100 Kilohms, and a room temperature gain resistor R9 of 40 Kilohms, a required gain change of 4 would dictate a temperature gain change resistor R8 value of 500 kilohms. Thus the parallel combination of thermistor T2 and temperature gain change resistor R8 having a value of 500 kilohms, provides a gain change of approximately 4 over the stipulated temperature range, with the highest gain, E*o*/E*i* at the lowest temperature, −31°]Centigrade. If a broader or narrower temperature excursion is required, the gain change will increase or decrease respectively by an amount which is substantially linear with the increase or decrease. By way of example, if the temperature range was cut in half to extend from 20° C. to −3° C., the gain change provided by a temperature gain change resistor R8 value of 500 kilohms would be approximately 2 over the smaller range where ΔT equals 23 Centigrade degrees. Needless to say the curve of FIG. 3 is constructed for a specific thermister T2, designated GA51L1, manufactured by Fenwal Electronics, in this case.

Figure 4:
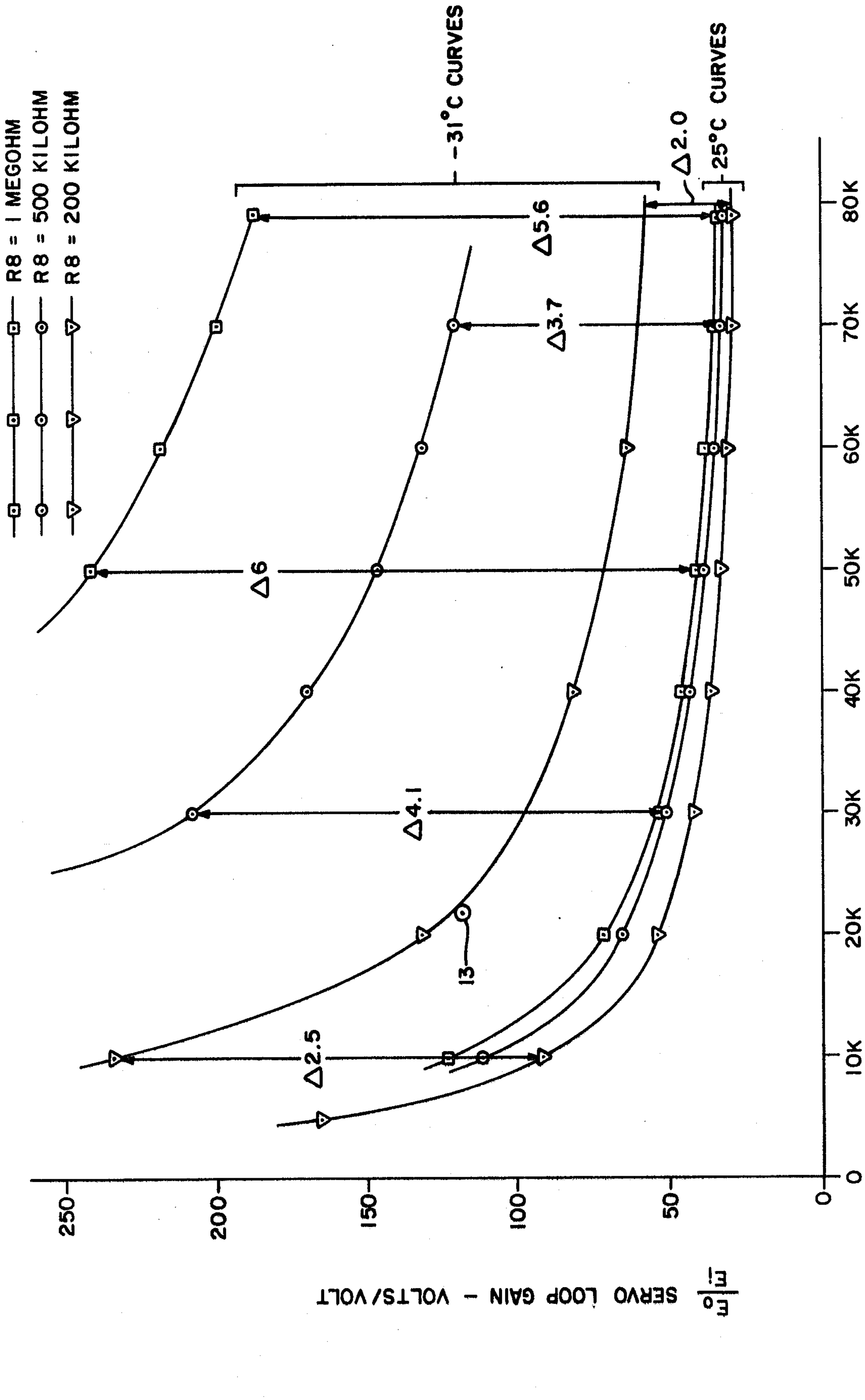
FIG. 4 is a set of room temperature gain selection curves.

The graph of FIG. 4 is utilized during calibration of the servo system where room temperature gain is selected. When room temperature gain calibration is performed dynamically, the gain selection curve of FIG. 4 is not used. In such a case, resistance R9 is selected to produce the proper value of the parameter such as natural frequency or damping ratio being set. If gain calibration at room temperature is not done dynamically, then the room temperature gain has been calculated. The calibration then merely requires that desired room temperature servo loop gain be selected on the ordinate of the FIG. 4 curve, and then that the graph be followed horizontally from the calculated room temperature gain value until an intersection is made with the appropriate +25° Centigrade or room temperature curves seen in FIG. 4. At the intersection with the appropriate room temperature curve, a line is dropped vertically to intersect the abscissa. This last-named intersection provides the value of room temperature gain resistor R9 required to accomplish the calculated room temperature gain. FIG. 4 shows typical circuit characteristics for gain changes of approximately 2, 4 and 6 times in the temperature range of +25° Centigrade to −31° Centigrade. it should be noted that the lower curves, designated the 25° Centigrade curves, are somewhat independent of the value of temperature gain change resistor R8. Gain change over the predetermined temperature range, however, is very dependent on the value of resistor R8. The gain change of approximately 2 is seen for temperature gain change resistor R8 value of 200 kilohms; gain change of approximately 4 for temperature gain change resistor R8 of 500 kilohms; and gain change of approximately 6 for temperature gain change resistor R8 of 1 megohm.

By way of example, suppose a gain change of 2 is required over a temperature range of 50 Centigrade degrees where a nominal room temperature of 50 volts per volt is required. Since the curve of FIG. 3 is drawn for a temperature range of 56 Centigrade degrees, it follows that the aforementioned linear relationship between gain change and temperature range would require the slope of the curve of FIG. 3 to be approximately ten percent less than the curve shown for a temperature range of 56 Centigrade degrees. Entering the curve of FIG. 3 at a servo loop gain change value of 2, and proceeding horizontally to the right, the curve of decreased slope is contacted at about point 12 shown on FIG. 3. Proceeding now vertically downward to the abscissa, a value for R8 of 200 kilohms is found. Going to the chart of FIG. 4 and entering at the ordinate at a value of 50 volts per volt, the room temperature curve for 200 kilohm value for R8 is intersected directly over an indicated value of approximately 22 kilohms for room temperature gain resistor R9. Travelling vertically upward on the 22 kilohm line for room temperature gain resistor R9, it is seen that a curve representing a predetermined temperature decrease of only 50 Centigrade degrees below the 25° Centigrade level would pass approximately through the point 13 of FIG. 4.

Point 13 falls on a curve somewhat below the −31° Centigrade curve for a room temperature gain resistor R8 value of 200 kilohms, because the graphs of FIG. 4 are constructed for a temperature range of 56 Centigrade degrees.

The finite gain transfer function for the circuit of fig. 2 is:

$$\left[\frac{R7 + \frac{RP \quad R9}{RP + R9}}{R6}\right]\left[\frac{RP + R9}{R9}\right]$$

Where:

R7 = 100 kilohm
R6 = 9.1 kilohm
RP = (R8 T2)/R8+T2)
R9 = 22 kilohm
T2 = 100 kilohm at +25° C
T2 = 1.6 megohm at −25° C
RP = 67 kilohm at +25° C, and
RP = 178 kilohm at −25° C The gain calculation at +25° C is 52 volts per volt, which is approximately the desired 50 volts per volt. Again, calculation at −25° C is 119 volts per volt, which is approximately the value seen at point 13 in FIG. 4. The change in gain, $\Delta Eo/Ei$, may be seen to be 119/52, or approximately 2.3 at a room temperature gain of 52 volts per volt.

It may be seen that a circuit has been disclosed for insertion in the forward portion of a servo loop which provides non interacting adjustment for room temperature gain and gain change over a predetermined temperature range. The gain change compensates for changes in operating characteristics such as natural frequency and damping seen in a fluid-filled device containing a servoed member, such as a fluid damped servo accelerometer.

What is claimed is:

1. A temperature compensation circuit for a fluid damped servo system operating within a predetermined temperature range, comprising a single operational amplifier having first and second input terminals and an output terminal, an input resistor connected to said first input terminal, a feedback path extending between said output terminal and said first input terminal, said feedback path including a thermistor and a temperature gain change resistor connected in parallel combination and a feedback resistor connected in series therewith, and a room temperature gain resistor connected between a circuit node between said feedback resistor and said parallel combination and said second input terminal, so that servo gain increases as fluid viscosity increases, whereby servo system operating parameters are maintained substantially the same over the predetermined temperature range.

2. A temperature compensation circuit for a servo-accelerometer having a fluid damped moving mass, a pick-off providing a signal indicative of the moving mass position, and motive means coupled to the moving mass, comprising a sole operational amplifier having a pair of inputs and an output, one of said inputs being coupled to receive the pick-off signal, a feedback path extending between said output and said one input, said feedback path including a temperature gain change control resistance element and a thermistor connected to form a parallel combination, and a feedback resistor in series with said parallel combination, and a basic gain control resistance coupled between the other of said pair of amplifier inputs and a circuit node between said parallel combination and feedback resistor, so that an amplified signal is obtained at said amplifier output providing increasing gain as damping fluid viscosity increases, whereby the motive means operates to reposition the moving mass in accordance with said amplified signal.

3. A method of setting basic gain and gain change over a predetermined temperature range in a fluid damped servo system having a known gain change necessary to maintain a selected operating parameter substantially constant throughout the predetermined temperature range, and a single operational amplifier with a signal input, a reference input and a feedback path therearound, comprising the steps of installing a temperature sensitive circuit combination in the feedback path, thereby providing the known gain change, and connecting a resistive element between the signal input side of the temperature sensitive circuit and the reference input, thereby providing room temperature gain, whereby interaction between room temperature gain and gain change is substantially eliminated.

* * * * *